Patented June 17, 1930

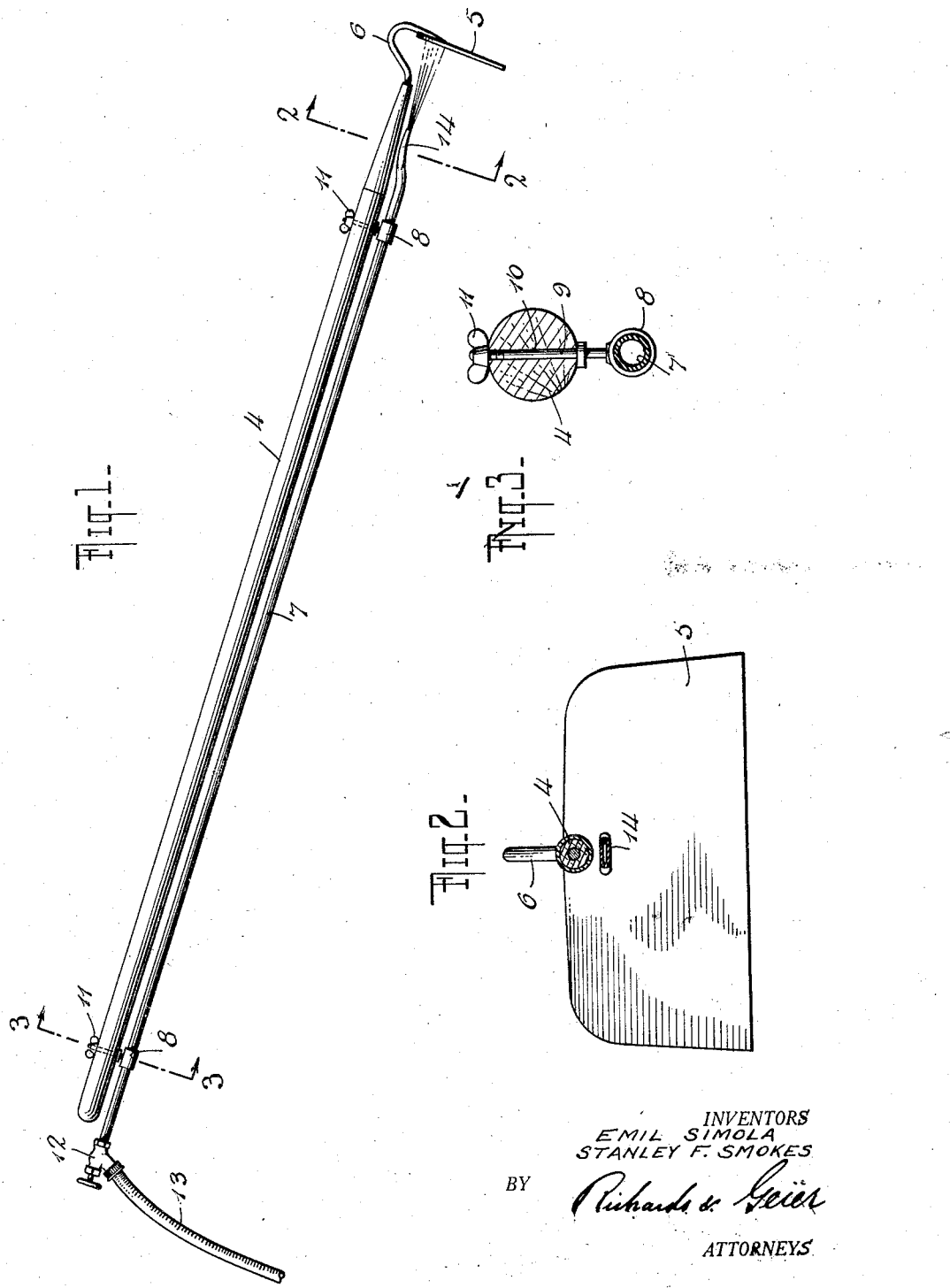

1,764,699

UNITED STATES PATENT OFFICE

EMIL SIMOLA AND STANLEY F. SMOKES, OF SOUTH OZONE PARK, NEW YORK

MIXING IMPLEMENT

Application filed November 28, 1928. Serial No. 322,544.

This invention relates to improvements in tools for mixing concrete, mortar and the like, and has particular reference to a fountain mixing implement.

An object of the invention is to provide an improved mixing implement of simple and practical construction, the use of which, when mixing substances such as concrete and mortar, will eliminate the employment of extra labor for supplying and regulating the flow of water to the composition.

Another object is to produce a more efficient distribution of the water supply by so positioning the supply pipe that the flow emitting from the outlet thereof will be impinged directly against the blade of the implement at substantially a right angle thereto and thus be effectively spread over the surface of that portion of the substance actually to be mixed.

The above and other objects will appear more clearly from the following detailed description, when taken in connection with the accompanying drawing, which illustrates a preferred embodiment of the inventive idea.

In the drawing—

Figure 1 is a side elevation of the mixing implement constructed in accordance with the invention;

Figure 2 is an enlarged section on the line 2—2 of Figure 1; and

Figure 3 is a similar section on the line 3—3 of Figure 1.

The invention is shown in its adaptation to a tool, such as an ordinary hoe, as consisting of a solid handle 4 having secured at one end a blade 5 by means of a curved shank 6 which disposes the blade in a plane substantially at a right angle to the longitudinal axis of the handle.

This customary construction of hoe is utilized to accomplish the present invention which, as shown, consists of a supply pipe 7 of substantially the same length as the handle 4 and supported longitudinally thereof at its under side. In order that the supply pipe may be readily detached from the handle and the hoe used for other purposes, if desired, couplings 8 are provided on the pipe 7 adjacent each end and have extending therefrom the bolts 9 capable of being projected through transverse openings 10 in the handle 4. Wing nuts 11 are threaded upon the bolts for securing the pipe in position and, as will be evident, the removal of these wing nuts is all that is necessary to detach the pipe 7 from the handle 4.

The upper end of the supply pipe 7 is provided with a suitable valve 12 to which is connected one end of a hose 13, the other end of which is joined to any suitable source of water supply. The valve 12 being located adjacent the upper end of the handle 4 permits of an easy regulation of the water supply pipe by the operator of the implement, so that the flow of water at the outlet end of the supply pipe 7 can be controlled.

The outlet end 14 of the pipe 7 is preferably flattened, as best shown in Figure 2, so as to widen the stream of water flowing from the pipe. The supply pipe and its outlet being disposed longitudinally of the handle 4 and the blade 5 being at substantially a right angle thereto, the stream of water from the pipe will be caused to impinge directly against the inner surface of the blade 5 adjacent its upper edge and also in a direction at substantially a right angle to said surface so that a considerable amount of the water will be caused to splash from the blade, rather than simply flow over the surface thereof. This results in a more effective and efficient distribution of the water over the surface of the composition which is actually being mixed by the blade 5, thereby facilitating the mixing operation.

What is claimed is:

The combination with an implement having a mixing blade, and a handle therefor; of a liquid supply pipe extending longitudinally thereof and having an outlet end adjacent said blade and disposed relative thereto so that the stream of liquid from the pipe will be impinged against said blade at substantially a right angle thereto, bolts extending laterally through said handle, and couplings at the ends of said bolts through which said supply pipe extends, and means to removably secure the bolts to the handles whereby said supply pipe is detachably supported by the latter.

In testimony whereof we have affixed our signatures.

EMIL SIMOLA.
STANLEY F. SMOKES.